US012630121B2

(12) United States Patent
Cho et al.

(10) Patent No.: US 12,630,121 B2
(45) Date of Patent: May 19, 2026

(54) SENSOR CLEANING SYSTEM

(71) Applicants: HYUNDAI MOTOR COMPANY, Seoul (KR); KIA CORPORATION, Seoul (KR); DONG HEE INDUSTRIAL CO., LTD., Ulsan (KR)

(72) Inventors: Seong Cheol Cho, Seoul (KR); Sung Won Lee, Hwaseong-si (KR); Chul Young Choi, Suwon-si (KR); Kun Su Hwang, Incheon (KR); Kyun Bum Park, Hwaseong-si (KR)

(73) Assignees: HYUNDAI MOTOR COMPANY, Seoul (KR); KIA CORPORATION, Seoul (KR); DONG HEE INDUSTRIAL CO., LTD., Ulsan (KR)

( * ) Notice: Subject to any disclaimer, the term of this patent is extended or adjusted under 35 U.S.C. 154(b) by 122 days.

(21) Appl. No.: 18/733,563

(22) Filed: Jun. 4, 2024

(65) Prior Publication Data

US 2025/0065849 A1 Feb. 27, 2025

(30) Foreign Application Priority Data

Aug. 25, 2023 (KR) ........................ 10-2023-0111773

(51) Int. Cl.
| | |
|---|---|
| *B60S 1/56* | (2006.01) |
| *B60S 1/48* | (2006.01) |
| *B60S 1/50* | (2006.01) |
| *B60S 1/52* | (2006.01) |
| *B60S 1/54* | (2006.01) |

(52) U.S. Cl.
CPC ................. *B60S 1/56* (2013.01); *B60S 1/481* (2013.01); *B60S 1/50* (2013.01); *B60S 1/52* (2013.01); *B60S 1/54* (2013.01)

(58) Field of Classification Search
CPC .... B60S 1/56; B60S 1/563; B60S 1/60; B60S 1/603
See application file for complete search history.

(56) References Cited

U.S. PATENT DOCUMENTS

| | | | |
|---|---|---|---|
| 2021/0261097 A1* | 8/2021 | Grether | B05B 1/3006 |
| 2022/0017047 A1* | 1/2022 | Gulde | B60S 1/56 |
| 2023/0250892 A1* | 8/2023 | Disch | B60S 1/56 137/1 |
| 2024/0101072 A1* | 3/2024 | Anderson | B60S 1/52 |
| 2025/0018901 A1* | 1/2025 | Op De Beeck | B60S 1/54 |

FOREIGN PATENT DOCUMENTS

WO WO-2022033927 A1 * 2/2022 ................ B60S 1/54

OTHER PUBLICATIONS

WO2022033927A1 Machine Translation (Year: 2022).*

* cited by examiner

*Primary Examiner* — Spencer E. Bell
(74) *Attorney, Agent, or Firm* — Lempia Summerfield Katz LLC

(57) ABSTRACT

A sensor cleaning system includes: an air nozzle that sprays compressed air toward a sensor; a liquid nozzle that sprays liquid toward the sensor; a fluid tank that stores compressed air to be supplied to the air nozzle and liquid to be supplied to the liquid nozzle; an air compressor that compresses and supplies external air into the fluid tank; and a distributor that selectively supplies compressed air from the fluid tank to the air nozzle and selectively supplies liquid from the fluid tank to the liquid nozzle.

13 Claims, 9 Drawing Sheets

SENSOR CLEANING SYSTEM

CROSS REFERENCE TO RELATED APPLICATION

The present application claims priority to Korean Patent Application No. 10-2023-0111773, filed Aug. 25, 2023, the entire contents of which are incorporated herein for all purposes by this reference.

BACKGROUND

Technical Field

The present disclosure relates to a sensor cleaning system for cleaning a sensor installed in a vehicle.

Description of the Related Art

In general, a camera or a lens used in a sensor installed in or on a vehicle detects or captures surrounding images and is disposed in the same location for a long period of time. The lens of such sensors may be easily contaminated by the surrounding environment, and the sharpness or clarity of the captured images may be easily degraded by such contamination. Furthermore, in the case of sensors that are required for autonomous driving of vehicles, a serious problem may be caused due to the degradation of the accuracy of sensors used for driving a vehicle.

Because of such a problem, sensors are generally installed in a case with protective glass in front of the sensors to prevent contamination of the sensors. However, the protective glass exposed to the outside will eventually become contaminated by the external environment. Therefore, the sharpness or clarity of the captured images may be easily degraded because of contamination of the protective glass even when the sensors are protected from direct contamination.

Accordingly, a sensor cleaning system is used to remove contamination from a sensor or a protective glass that protects the outer surface of the sensor.

The conventional sensor cleaning system for a vehicle is provided with a liquid cleaning device using liquid and an air cleaning device using air. The liquid cleaning device and the air cleaning device are separately configured. Thereby, there is a problem of reduced manufacturability of the sensor cleaning system because the size or volume of the sensor cleaning system is excessively increased and, the requisite electrical wiring and piping become excessive.

Specifically, the conventional sensor cleaning system has a problem in that an air tank and a liquid tank are installed separately, resulting in an excessively large or complicated layout. The system becomes complicated because electrical wiring components and piping components for both a connection between an air compressor and an air tank and a connection between a liquid pump and a liquid tank for pressurizing and transferring air and liquid are required.

SUMMARY

The present disclosure is provided in consideration of the above problems and seeks to provide a sensor cleaning system capable of achieving improved manufacturability and improved efficiency by simplifying the system configuration and structure.

The objectives of the present disclosure are not limited to the above-mentioned objectives. Other objectives of the present disclosure not mentioned above may be clearly understood by those of ordinary skill in the art from the following description.

To achieve the above objectives, the present disclosure proposes a sensor cleaning system. The system includes an air nozzle that sprays compressed air toward a sensor and a liquid nozzle that sprays liquid toward the sensor. The system also includes a fluid tank that stores compressed air to be supplied to the air nozzle and liquid to be supplied to the liquid nozzle. The system also includes an air compressor that compresses external air and supplies the compressed external air into the fluid tank. The system also includes a distributor that selectively supplies compressed air from the fluid tank to the air nozzle and selectively supplies liquid from the fluid tank to the liquid nozzle.

According to an embodiment of the present disclosure, the fluid tank may be configured to pressurize and transfer liquid in the fluid tank using the pressure of compressed air in the fluid tank.

In addition, the distributor may include: a housing that has an air chamber connected to the air nozzle and a liquid chamber connected to the liquid nozzle; an air chamber valve, which is provided in the housing and controlled to open or close a vent port of the air chamber; and a liquid chamber valve, which is provided in the housing and controlled to open or close a vent port of the liquid chamber.

The fluid tank may be connected to the air chamber through an air line. The air line may include an air supply control valve configured to control the flow of compressed air being supplied from the fluid tank to the air chamber.

In addition, the fluid tank may be connected to the liquid chamber through a liquid line. The liquid line may include a liquid supply control valve configured to control the flow of liquid being supplied from the fluid tank to the liquid chamber.

In addition, a pressure relief line may branch off from the air line and may include an electronic relief valve controlled by a controller.

When the controller detects a liquid inlet provided in the fluid tank is open, the compressed air in the fluid tank may be transferred by operating the electronic relief valve and the air supply control valve in an open mode.

In addition, the controller may be configured to operate the air chamber valve in an open mode when the electronic relief valve and the air supply control valve operate in an open mode.

In addition, the controller may be configured to monitor the internal pressure of the fluid tank through a pressure sensor.

The liquid inlet may be provided with a mechanical relief valve to relieve excess pressure in the fluid tank. The mechanical relief valve may release compressed air out of the fluid tank by opening the liquid inlet when the internal pressure of the fluid tank exceeds a predetermined pressure.

In addition, the inside of the fluid tank may include a baffle module, which bisects the interior space of the fluid tank and have a ventilation structure through which fluid may pass.

Specifically, the baffle module may include a plurality of baffles that bisect the interior space of the fluid tank. The plurality of baffles may have air vents and may be spaced apart from each other in a row. The air vents of each the baffles may be positioned at different locations in a direction perpendicular to the arrangement directions of the baffles. In addition, each baffle may have a structure that slopes from an edge thereof to an air vent in the center thereof.

In addition, the liquid nozzle may be connected to the liquid chamber through a liquid tube. The liquid tube may be provided with a heater that selectively operates depending on the external temperature.

According to the embodiments for solving the problem described above, the present disclosure provides the following effects.

First, an air tank and a liquid tank of the conventional sensor cleaning system are integrated. Accordingly, compressed air and liquid may be pressurized and transferred to a sensor using only an air compressor. Thereby, the system configuration and structure may be simplified while improving system efficiency and enabling reduction of cost and weight.

Second, since a separate liquid pump is not necessary, vibration and noise due to the liquid pump are reduced or eliminated and the operating power of the system is also reduced compared to conventional systems.

Third, since the air tank and the liquid tank of the conventional sensor cleaning system are integrated and since compressed air and liquid may be pressurized and transferred to a sensor using only the air compressor, electrical wiring components and piping components in the system are simplified. Thereby, the energy loss caused by the pressurized transfer of fluid is reduced.

The effects of the present disclosure are not limited to the above-mentioned effects. Other effects of the present disclosure not mentioned above may be clearly understood by those of ordinary skill in the art from the following description.

DETAILED DESCRIPTION OF THE DISCLOSURE

Hereinafter, embodiments of the present disclosure are described with reference to the accompanying drawings. The items or components included in the accompanying drawings are illustrated to describe embodiments of the present disclosure and may be different from those actually implemented.

In addition, in the present disclosure, it should be understood that, although the terms first, second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element. When a component, device, element, or the like of the present disclosure is described as having a purpose or performing an operation, function, or the like, the component, device, or element should be considered herein as being "configured to" meet that purpose or perform that operation or function.

Figure 1:
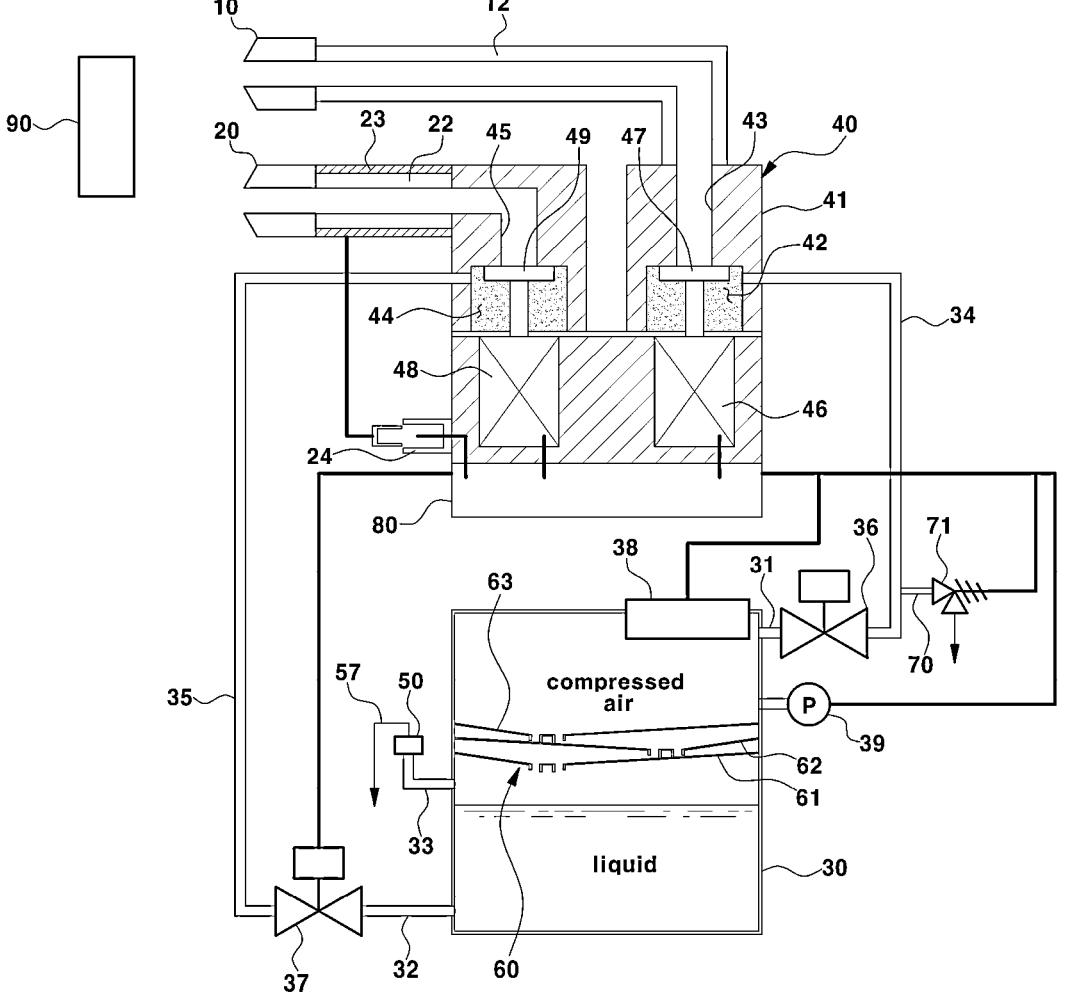
FIG. 1 is a block diagram showing a sensor cleaning system according to an embodiment of the present disclosure.

As shown in FIG. 1, a sensor cleaning system according to an embodiment of the present disclosure includes an air nozzle for spraying compressed air toward a sensor 90 to be cleaned, a liquid nozzle 20 for spraying liquid toward the sensor 90, and a fluid tank 30 for storing the compressed air and the liquid.

The air nozzle 10 cleans the sensor 90 by spraying compressed air toward the sensor 90 and the liquid nozzle 20 cleans the sensor 90 by spraying liquid toward the sensor 90. The liquid may be a cleaning liquid for cleaning the sensor 90.

The fluid tank 30 stores compressed air that is supplied to the air nozzle 10 and stores liquid that is supplied to the liquid nozzle 20. In the fluid tank 30, the compressed air and the liquid may be separated by density difference and gravity. Compressed air is stored in a first space of an interior space of the fluid tank 30 and liquid is stored in a second space of the interior space of the fluid tank 30. The interior space of the fluid tank 30 includes the first space and the second space. Based on the direction of gravitational action, the first space may be an upper space over the second space. In other words, the first space may be an upper space of the interior space of the fluid tank 30 and the second space may be a lower space of the interior space of the fluid tank 30.

The compressed air is air pressurized to a pressure higher than atmospheric pressure. The compressed air is pressurized by an air compressor 38 and then supplied to the fluid tank 30. The liquid is selectively pressurized and then transferred from the fluid tank 30 by the pressure of the compressed air. The liquid may be pressurized and then transferred from the fluid tank 30 to the liquid nozzle 20 by the pressure of the compressed air in the fluid tank 30 and may be sprayed through the liquid nozzle toward the sensor 90.

The air compressor 38 may be provided at the upper end of the fluid tank 30. The air compressor is provided in the fluid tank 30 so that the air compressor is connected to the first space of the fluid tank 30 that stores compressed air. The operation of the air compressor 38 is controlled by a controller 80.

The controller 80 controls a sensor cleaning system overall. The controller 80 may monitor the internal pressure of the fluid tank 30 through a pressure sensor 39 that detects the internal pressure of the fluid tank 30. In this case, the internal pressure of the fluid tank 30 may refer to the pressure of compressed air.

The fluid tank 30 includes an air outlet 31 for emitting compressed air, a liquid outlet 32 for emitting liquid, and a liquid inlet 33 for injecting or providing liquid. Referring to FIG. 1, the air outlet 31 is positioned at an upper part of the fluid tank 30 and the liquid outlet 32 is positioned at the lower part of the fluid tank 30. The liquid inlet 33 may be positioned at one side of the fluid tank 30 regardless of the height of the liquid stored in the fluid tank 30.

The air outlet 31 is connected to an air line 34 for compressed air to pass through. The liquid outlet 32 is connected to a liquid line 35 for liquid to pass through. The fluid tank is connected to the distributor 40 through the air line 34 and the liquid line 35 through which fluid (e.g., air and liquid, respectively) may pass. In addition, the fluid tank 30 is connected to the air nozzle 10 and the liquid nozzle 20 through the distributor 40.

The distributor 40 is configured to selectively supply compressed air supplied from the fluid tank 30 to the air nozzle and is configured to selectively supply liquid supplied from the fluid tank 30 to the liquid nozzle 20.

Specifically, the distributor 40 includes a housing 41 that has an air chamber 42 and a liquid chamber 44 independent of each other, an air chamber valve 46 to open or close a vent port 43 of the air chamber 42, and a liquid chamber valve 48 to open or close a vent port 45 of the liquid chamber 44.

The air chamber 42 is connected to the fluid tank 30 through the air line 34, enabling air to pass therethrough. The liquid chamber 44 is connected to the fluid tank 30 through the liquid line 35, enabling liquid to pass therethrough.

In addition, the vent port 43 of the air chamber 42 is connected to the air nozzle 10 through an air tube 12, enabling fluid to pass therethrough. The vent port 45 of the liquid chamber 44 is connected to the liquid nozzle 20 through a liquid tube 22, enabling fluid to pass therethrough.

The air chamber valve 46 is an electronic solenoid controlled by the controller 80. The air chamber valve 46 is configured to open or close the vent port 43 of the air chamber 42 by a plunger 47 that linearly moves by an electromagnetic force. Referring to FIG. 1, the air chamber valve 46 is positioned at the lower part of the air chamber 42 and is configured to open or close the vent port 43 of the air chamber 42 through the linear movement of the plunger 47.

The liquid chamber valve 48 is also an electronic solenoid valve controlled by the controller 80. The liquid chamber valve 48 is configured to open or close the vent port 45 of the liquid chamber 44 by a plunger 49 that linearly moves by an electromagnetic force. Referring to FIG. 1, the liquid chamber valve 48 is positioned at the lower part of the liquid chamber 44 and is configured to open or close the vent port 45 of the liquid chamber 44 through the linear movement of the plunger 49.

In addition, the air line 34 is provided with an air supply control valve 36 which controls compressed air flowing from the fluid tank 30 to the air chamber 42 through the air line 34. The liquid line 35 is provided with a liquid supply control valve 37 which controls liquid flowing from the fluid tank 30 to the liquid chamber 44 through the liquid line 35. The air supply control valve 36 and the liquid supply control valve 37 are controlled by the controller 80.

Figure 2:
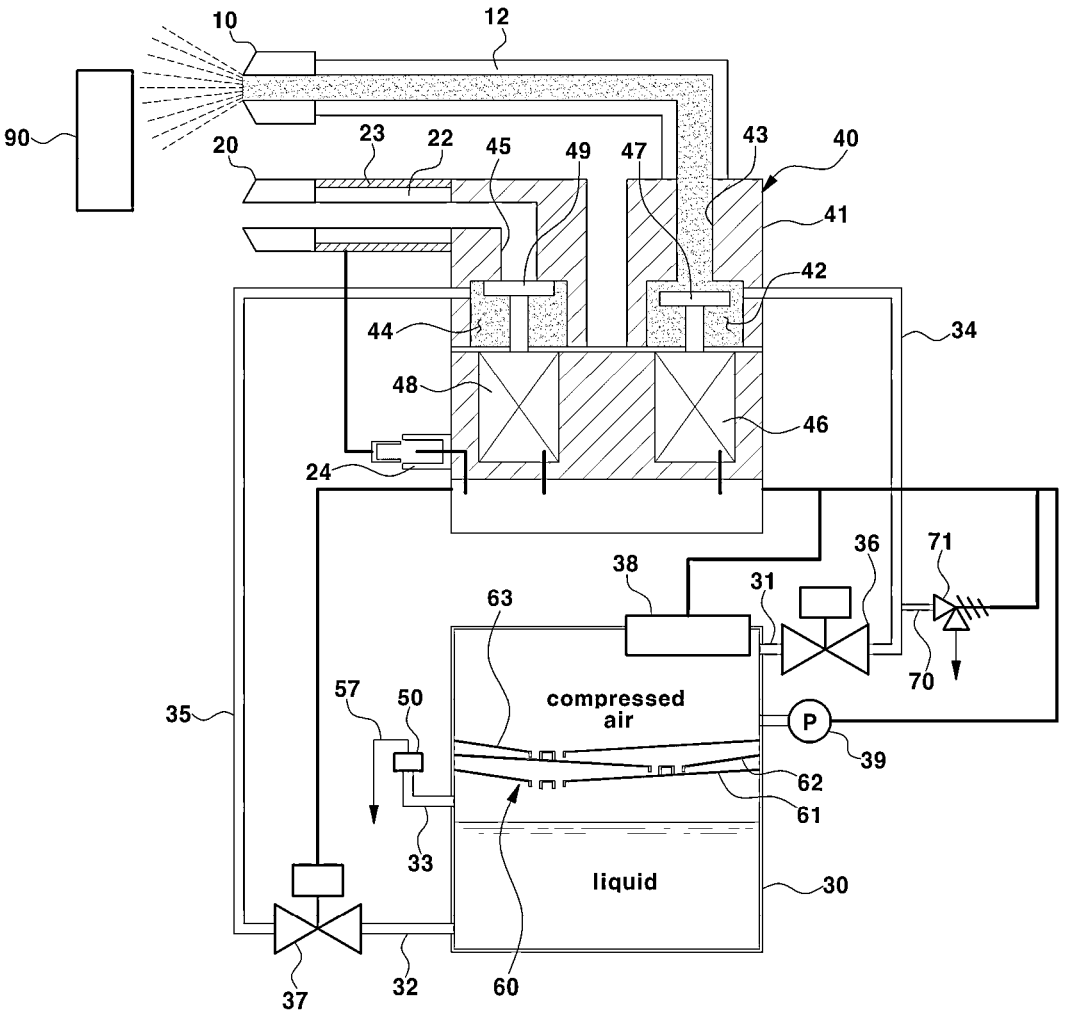
FIGS. 2-4 are views showing an operating state of the sensor cleaning system according to an embodiment of the present disclosure.

In the sensor cleaning system of the present disclosure configured as described above, when the air compressor 38 operates by (e.g., under direction of) the controller 80 and the air supply control valve 36 and the air chamber valve 46 operate in an open mode, the compressed air in the fluid tank 30 flows to the air chamber 42 through the air line 34 as shown in FIG. 2. The compressed air flowing into the air chamber 42 is supplied to the air nozzle 10 through the vent port 43 of the air chamber 42 and is sprayed toward the sensor 90 through the air nozzle 10, so the sensor 90 is cleaned.

Figure 3:
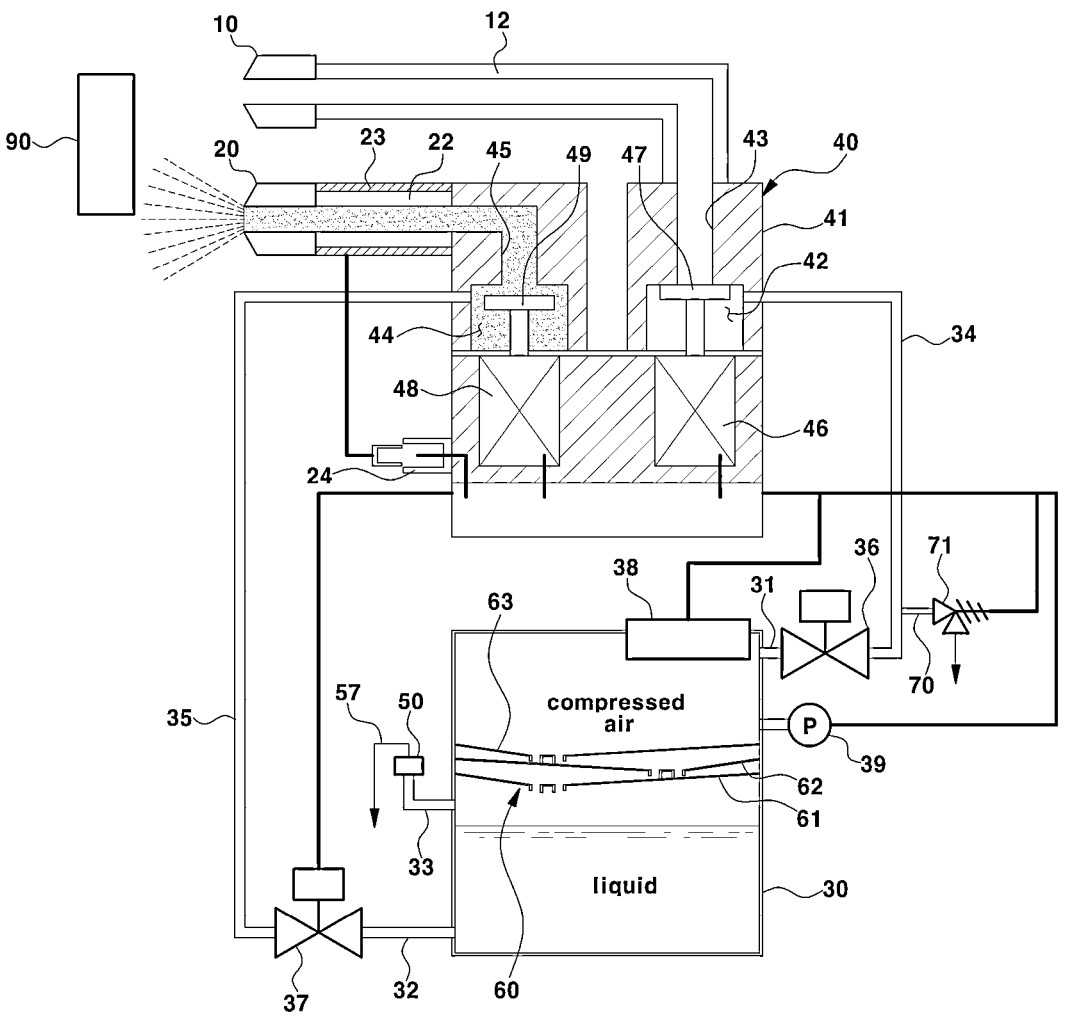

In addition, in the sensor cleaning system, when the air compressor 38 operates by (e.g., under direction of) the controller 80 and the liquid supply control valve 37 and the liquid chamber valve 48 operate in an open mode, the liquid in the fluid tank 30 flows to the liquid chamber 44 through the liquid line 35 as shown in FIG. 3. The liquid flowing into the liquid chamber 44 is supplied to the liquid nozzle 20 through the vent port 45 of the liquid chamber 44 and is sprayed toward the sensor 90 through the liquid nozzle 20, so the sensor 90 is cleaned. In this case, the liquid is pressurized and transferred from the fluid tank 30 by the pressure of compressed air in the fluid tank 30 to the liquid nozzle 20 and then is sprayed toward the sensor 90.

In addition, the liquid tube 22 is provided with a heater 23 to prevent freezing of the liquid nozzle 20 and the liquid tube 22 when the external temperature is low. The heater 23 is controlled by the controller 80 and selectively operates (e.g., selectively generates heat) depending on the external temperature. The heater 23 enable heating of the liquid nozzle by transferring the heat of the heater 23 to the liquid nozzle when heating the liquid tube 22. In addition, the heater enables directly heating the liquid nozzle 20 when the end part of the heater 23 is in contact with or adjacent to the liquid nozzle 20. The heater 23 may be connected to the controller 80 through a connector 24 provided in the distributor 40. The controller 80 may be stacked at the lower part of the distributor (See FIG. 1).

Figure 4:
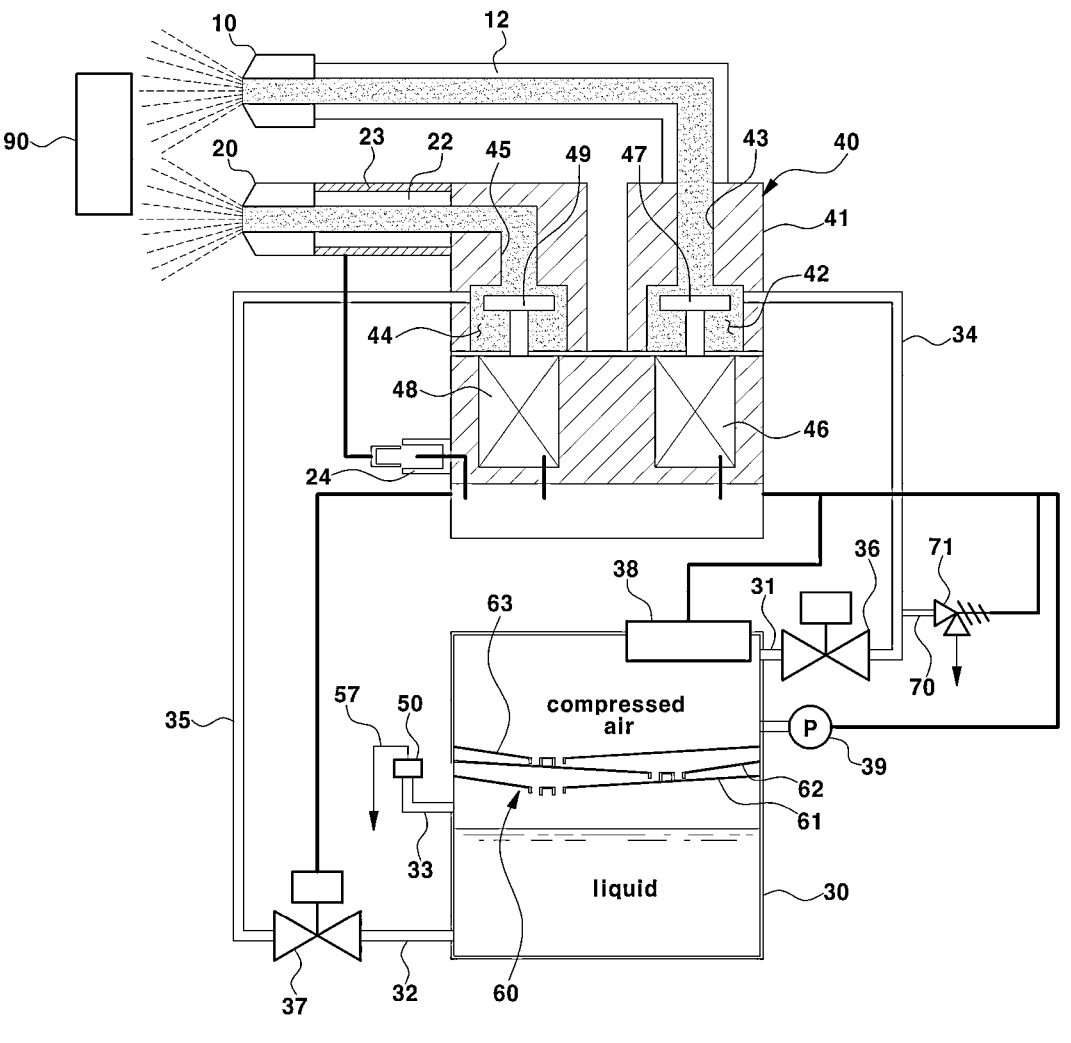

In addition, the sensor cleaning system is also capable of simultaneously spraying compressed air and liquid toward the sensor 90 as shown in FIG. 4. In this case, the control of the controller 80 spraying compressed air toward the sensor 90 through the air nozzle 10 is simultaneously performed with the control of the controller 80 spraying liquid toward the sensor 90 through the liquid nozzle 20.

Meanwhile, the liquid inlet 33 in the fluid tank 30 is provided with a mechanical relief valve 50. The mechanical relief valve 50 for relieving the overpressure, i.e., excess pressure of the fluid tank 30 releases compressed air from the fluid tank by selectively opening the liquid inlet 33. For example, the mechanical relief valve 50 relieves the excess pressure of the fluid tank 30 by opening the liquid inlet 33 if the internal pressure of the fluid tank 30 exceeds a predetermined pressure when starting or parking a vehicle.

For this, the liquid inlet 33 protrudes outwardly from the outer surface of the fluid tank 30 and is positioned higher than a predetermined maximum height of liquid to be stored in the fluid tank 30.

Figure 5:
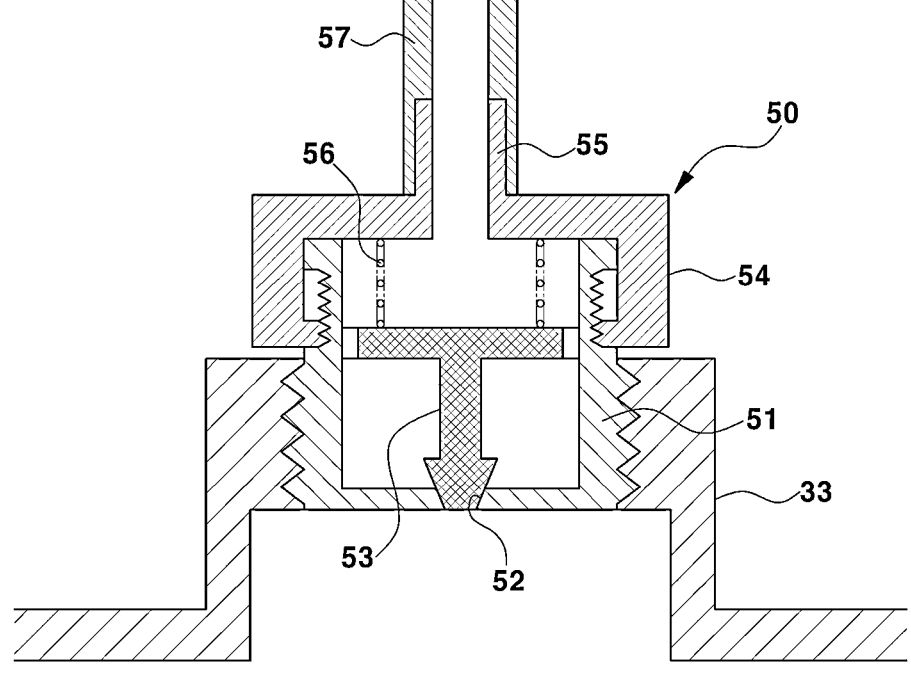
FIG. 5 is a block diagram showing a mechanical relief valve of a sensor cleaning system according to an embodiment of the present disclosure.

As shown in FIG. 5, the mechanical relief valve 50 is configured to include a valve case 51 equipped with a venting hole 52, a valve body 53 located in the valve case 51 to open or close the venting hole 52, and a valve cap 54 to resiliently press the valve body 53 toward the venting hole 52.

In order to enable the mechanical relief valve 50 to perform as a cap of the liquid inlet 33, the valve case 51 is detachably assembled to the liquid inlet 33. The venting hole 52 is directly connected to the liquid inlet 33.

Specifically, the valve case 51 may have an outer surface with a spiral structure which may be fastened with the inner surface of the liquid inlet 33 The valve case 51 may have a venting hole 52 on the bottom surface thereof. The upper surface of the valve case is covered by a valve cap 54 The valve cap 54 is linearly movably assembled on the upper side of the valve case 51.

A spring member 56 is connected and positioned between the valve cap 54 and the valve body 53. The valve body 53 is pressed down toward the venting hole 52 by the elastic restoring force of the spring member 56.

The valve body 53 is assembled to be linearly movable inside the valve case 51 and moves to the direction in which the venting hole 52 is opened by selectively compressing the spring member 56 using the pressure of compressed air flowing and acting through the venting hole 52.

Figure 6:
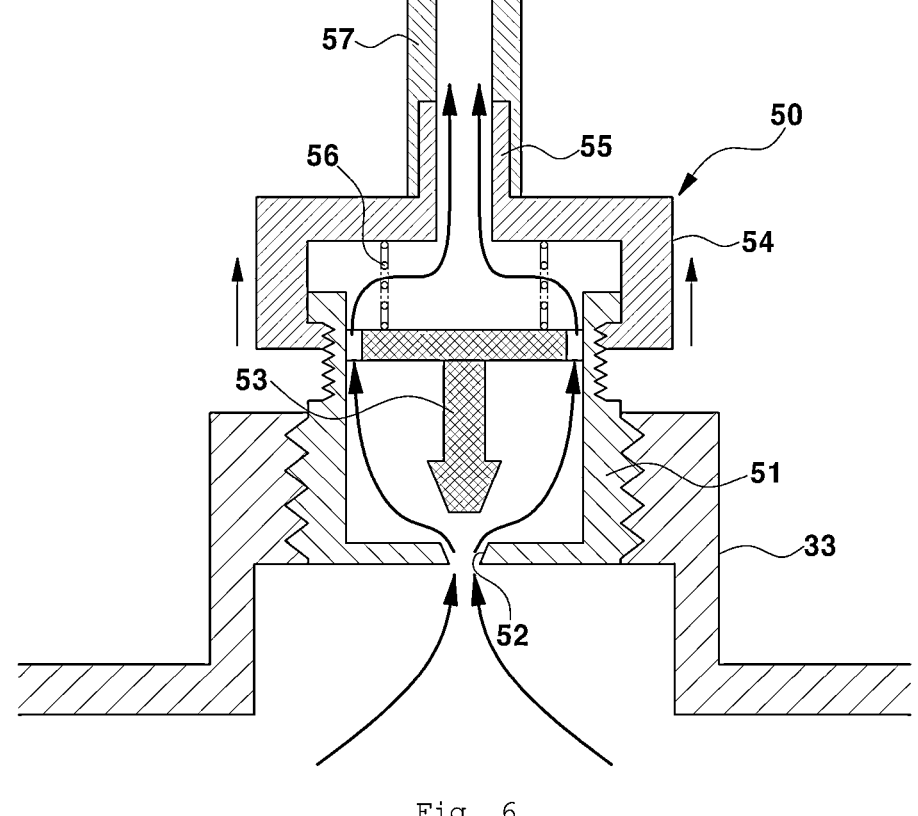
FIGS. 6 and 7 are views showing an operating state of a mechanical relief valve according to an embodiment of the present disclosure.

The valve cap 54 has a cap outlet 55 selectively connected to the venting hole 52 and emits compressed air to the outside through the cap outlet 55 when the venting hole 52 is opened. In addition, when the valve cap 54 is rotated by a user in the direction of being released in the valve case 51, the valve cap 54 linearly moves away from the venting hole 52 as shown in FIG. 6. Accordingly, as the spring member 56 is loosened, the elastic restoring force of the spring member 56 pressing on the valve body 53 is decreased and the venting hole 52 is opened. In this way, the internal pressure of the fluid tank 30 may be manually relieved as needed.

Figure 7:
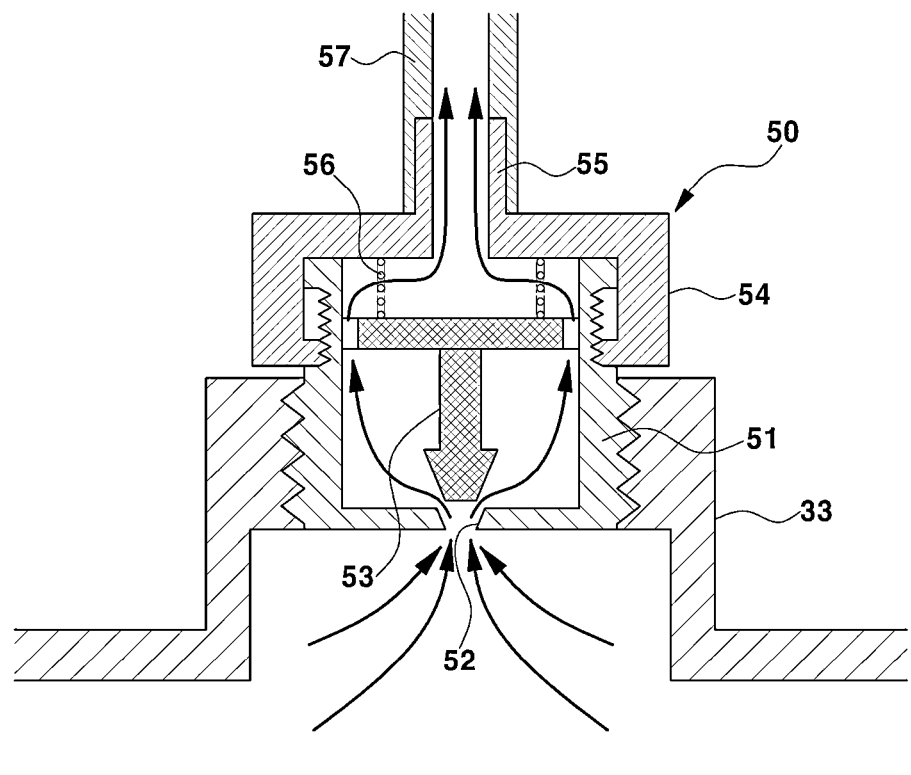

In addition, as shown in FIG. 7, when excess pressure occurs in the fluid tank 30, the internal pressure of the fluid tank 30 rises and becomes greater than the elastic restoring force of the spring member 56. Thereby, the spring member 56 is further compressed causing the valve body 53 to move toward the valve cap 54 located at a position opposite the venting hole 52. Accordingly, when the venting hole 52 is opened, the compressed air in the fluid tank 30 is released to the outside and the excess pressure in the fluid tank 30 is relieved.

In this way, when the internal pressure of the fluid tank rises and exceeds a predetermined pressure, the excess pressure in the fluid tank 30 is relieved by externally emitting the compressed air in the fluid tank 30 through the mechanical relief valve 50.

In addition, the cap outlet 55 may be connected to a venting hose 57. The venting hose 57 may be piped toward the lower side of a vehicle or piped in a manner in which a user is not obstructed when operating the mechanical relief valve 50.

Figure 8:
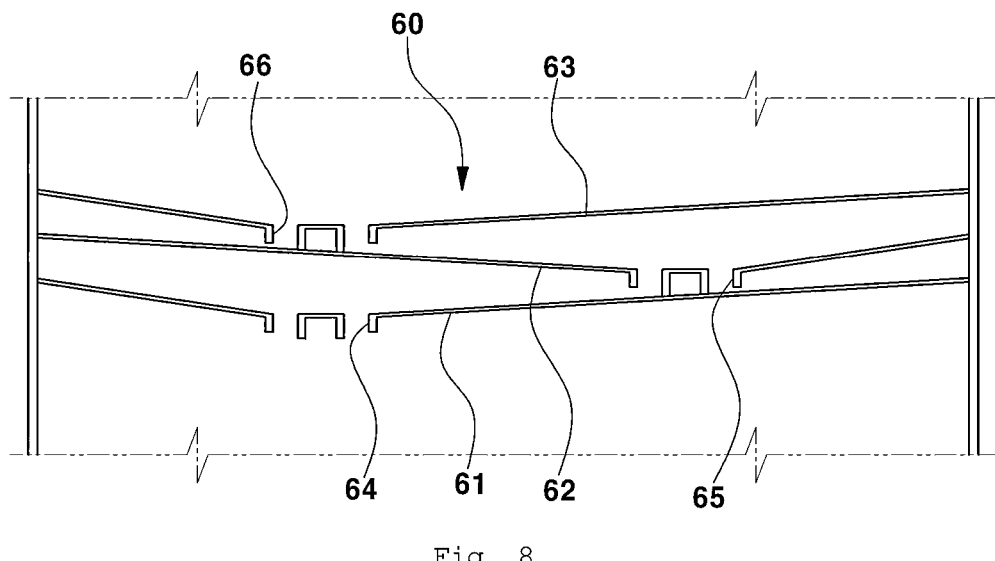
FIG. 8 is a view showing a baffle module provided in a fluid tank of a sensor cleaning system according to an embodiment of the present disclosure.

FIG. 8 is an enlarged view of the baffle module 60 shown in FIG. 1. The baffle module 60 is provided in the interior of the fluid tank 30. The baffle module 60 bisects the interior space of the fluid tank 30 into a first space and a second space.

The first space of the fluid tank 30 stores compressed air, the second space of the fluid tank 30 stores liquid, and a part of the second space of the fluid tank 30 (i.e., space adjacent to the baffle module) may store compressed air.

The baffle module 60 prevents liquid from flowing into the first space of the fluid tank 30 due to vibration or impact given to the fluid tank 30 while a vehicle is driven.

In addition, the baffle module 60 bisects the interior space of the fluid tank 30 into the first space and the second space and has a ventilation structure through which fluid can flow in order to allow the pressure of the compressed air stored in the first space to act on the liquid stored in the second space.

In other words, the baffle module 60 has at least one air vent 64, 65, and 66 in order to allow the pressure of the compressed air to act on the second space of the fluid tank 30 while preventing liquid from flowing into the first space of the fluid tank 30.

As shown in FIG. 8, the baffle module 60 includes a plurality of the baffles 61, 62, 63 that bisect an interior space of the fluid tank 30 into the first space and the second space. A plurality of the baffles 61, 62, 63 are spaced apart in a row within the fluid tank 30, and each has an air vent 64, 65, 66. A plurality of the baffles 61, 62, 63 may be positioned up and down (e.g., vertically) within the fluid tank 30.

In an embodiment of the present disclosure, the baffle module 60 includes a first baffle 61, a second baffle 62 and a third baffle 63. The first baffle 61 has a first air vent 64 being located in the center thereof and an edge part being fixed in an inner wall surface of the fluid tank 30. A second baffle 62 is positioned above the first baffle 61 and has a second air vent 65 being located in the center thereof and an edge part being fixed in the inner wall surface of the fluid tank 30. In addition, a third baffle 63 is positioned above the second baffle 62 and has a third air vent 66 located in the center thereof and an edge part being fixed in the inner wall surface of the fluid tank 30.

The first baffle 61, the second baffle 62 and the third baffle 63 are sheet structures, the edges of which are tightly and fully joined with the inner wall surfaces of the fluid tank 30. The first baffle 61, second baffle 62, and third baffle 63 allow fluid to flow only through each air vent 64, 65, 66, respectively. At this time, in order to prevent liquid from flowing into the first space of the fluid tank 30 through the vents 64, 65, 66, the first vent 64, the second vent 65, and the third vent 66 are positioned in a different location in a direction perpendicular to the arrangement direction of the baffles 61, 62, 63. For example, when the baffles 61, 62, 63 are arranged up and down (e.g., vertically), the air vents 64, 65, 66 are positioned relative to each other in a different location of a horizontal direction.

In addition, in order to allow liquid to smoothly return to the second space of the fluid tank 30 when liquid happens to move into the first space of the fluid tank 30 through the air vents 64, 65, 66, each baffle 61, 62, 63 has a structure that slopes from its edge to the air vents 64, 65, 66 in the center. For example, each baffle 61, 62, 63 may have a funnel structure or a trumpet structure.

In addition, condensate water made when moisture in compressed air is condensed may also flow into the second space of the fluid tank 30 through the sloping structure of the baffles 61, 62, 63. In addition as shown in FIG. 1, the liquid inlet 33 of the fluid tank 30 may be positioned at the place lower than the baffle module 60.

Meanwhile, referring to FIG. 1, a pressure relief line 70 is branched (e.g., branches, diverges) from the air line 34 connected to the fluid tank 30. The pressure relief line 70 is provided with an electronic relief valve 71 controlled by the controller 80.

The electronic relief valve 71 may force the compressed air in the fluid tank 30 to be released before injecting or providing liquid into and filling the fluid tank 30. In other words, the electronic relief valve 71 may forcibly release the inner pressure of the fluid tank 30 until atmospheric pressure is reached by operating in an open mode when the liquid inlet 33 is open for injecting liquid into the fluid tank 30.

Figure 9:
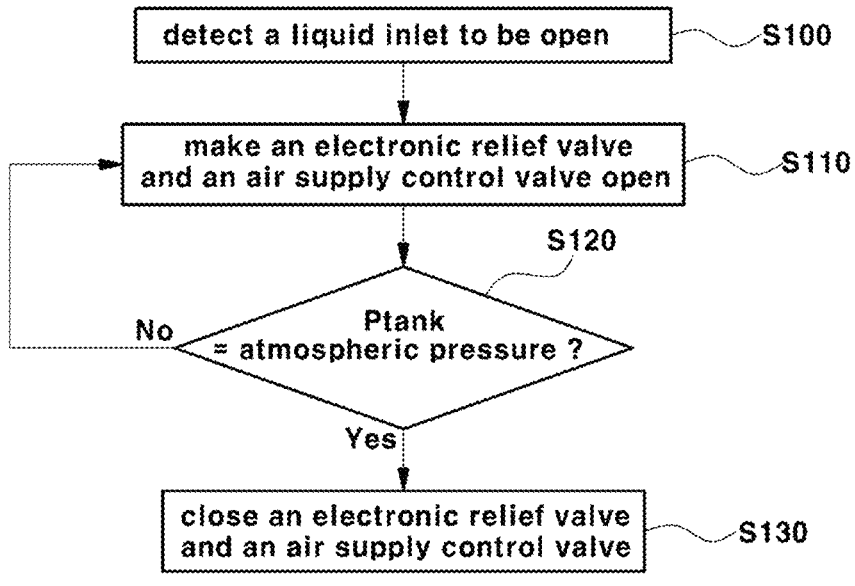
FIG. 9 is a flowchart showing a forced emission process of a fluid tank in a sensor cleaning system according to an embodiment of the present disclosure.

Referring to FIG. 9, when the controller 80 detects S100 the liquid inlet 33 being open, the controller operates the electronic relief valve 71 and the air supply control valve 36 in an open mode S110. Thereafter, the controller 80 determines whether the internal pressure (Ptank) of the fluid tank 30 reaches atmospheric pressure S120. The controller 80 operates the electronic relief valve 71 and the air supply control valve 36 in a closed mode S130 when the internal pressure of the fluid tank 30 reaches atmospheric pressure.

In addition, when the controller 80 operates the electronic relief valve 71 and the air supply control valve 36 in an open mode, the controller may also operate the air chamber valve 46 in an open mode, thereby reducing the forced ventilation time in the fluid tank 30.

The controller 80 may monitor the internal pressure of the fluid tank 30 through a pressure sensor 39. The pressure sensor 39 is provided in the fluid tank 30 and detects the internal pressure of the fluid tank 30 in real time. When the controller 80 detects the internal pressure of the fluid tank 30 decreasing below a predetermined pressure, the controller 80 may determine that the liquid inlet 33 is open. The liquid inlet 33 is opened by disconnecting the valve case 51 of the mechanical relief valve 50 from the liquid inlet 33.

In addition, the controller 80 may control the operation of the air compressor 38 based on the internal pressure of the fluid tank 30.

Meanwhile, it is not possible to clean the sensor 90 while the internal pressure of the fluid tank 30 in atmospheric pressure is rising through the air compressor 38 when a vehicle is restarted. Accordingly, the controller 80 may forcibly clean the sensor 90 by pressurizing and transferring compressed air to the air nozzle 10 when the liquid inlet 33 is opened immediately after the engine of a vehicle is turned off. Thereby, cleaning of the sensor 90 is unnecessary immediately after a vehicle is restarted.

In addition, the internal pressure of the fluid tank 30 is maintained when the liquid inlet 33 is not opened after the engine of a vehicle is turned off. In addition, the vehicle's constant power is used for the forced ventilation in the fluid tank 30 as well as the air compressor 39 to detect whether the liquid inlet 33 is opened or not when the engine of a vehicle is turned off.

Embodiments of the present disclosure have been described in detail above, but the terms used in the specification and claims are not to be construed in their ordinary or dictionary sense. The scope of the present disclosure is not limited to the embodiments described above, and various modifications and improvements by those of ordinary skill in the art using the basic concepts of the present disclosure as defined in the claims below are also included in the scope of the present disclosure.

What is claimed is:

1. A sensor cleaning system comprising:
an air nozzle configured to spray compressed air toward a sensor;
a liquid nozzle configured to spray liquid toward the sensor;
a fluid tank configured to store compressed air to be supplied to the air nozzle and liquid to be supplied to the liquid nozzle;
an air compressor configured to compress external air and supply the compressed external air into the fluid tank; and
a distributor configured to selectively supply compressed air from the fluid tank to the air nozzle and to selectively supply liquid from the fluid tank to the liquid nozzle
wherein the fluid tank is provided with a baffle module therein, and
wherein the baffle module comprises a plurality of baffles that bisect the interior space of the fluid tank, wherein the plurality of baffles have air vents and are spaced apart from each other in a row, and wherein the air vents of each the baffles are positioned at different locations in a direction perpendicular to the arrangement direction of the baffles.

2. The sensor cleaning system of claim 1, wherein the fluid tank is configured to pressurize and transfer liquid in the fluid tank using the pressure of compressed air in the fluid tank.

3. The sensor cleaning system of claim 1, wherein the distributor comprises:
a housing that has an air chamber connected to the air nozzle and a liquid chamber connected to the liquid nozzle;
an air chamber valve provided in the housing and controlled to open or close a vent port of the air chamber; and
a liquid chamber valve provided in the housing and controlled to open or close a vent port of the liquid chamber.

4. The sensor cleaning system of claim 3, wherein the fluid tank is connected to the air chamber through an air line, and wherein the air line includes an air supply control valve configured to control the flow of compressed air being supplied from the fluid tank to the air chamber.

5. The sensor cleaning system of claim 3, wherein the fluid tank is connected to the liquid chamber through a liquid line, and wherein the liquid line includes a liquid supply control valve configured to control the flow of liquid being supplied from the fluid tank to the liquid chamber.

6. The sensor cleaning system of claim 4, wherein a pressure relief line diverges from the air line and includes an electronic relief valve controlled by a controller.

7. The sensor cleaning system of claim 6, wherein the controller is configured to transfer the compressed air in the fluid tank by operating the electronic relief valve and the air supply control valve in an open mode when the controller detects a liquid inlet provided in the fluid tank is open.

8. The sensor cleaning system of claim 7, wherein the controller is configured to operate the air chamber valve in an open mode when the electronic relief valve and the air supply control valve operate in an open mode.

9. The sensor cleaning system of claim 6, wherein the controller is configured to monitor the internal pressure of the fluid tank through a pressure sensor.

10. The sensor cleaning system of claim 7, wherein the liquid inlet is provided with a mechanical relief valve to relieve excess pressure in the fluid tank.

11. The sensor cleaning system of claim 10, wherein the mechanical relief valve emits compressed air in the fluid tank out of the fluid tank by opening the liquid inlet when the internal pressure of the fluid tank exceeds a predetermined pressure.

12. The sensor cleaning system of claim 1, wherein each baffle has a structure that slopes from its edge to an air vent in the center.

13. The sensor cleaning system of claim 3, wherein the liquid nozzle is connected to the liquid chamber through a liquid tube, and the liquid tube is provided with a heater that selectively operates depending on the external temperature.

\* \* \* \* \*